United States Patent
Helfenstein et al.

(10) Patent No.: US 9,038,420 B2
(45) Date of Patent: May 26, 2015

(54) DWELL TIME CONTROL SYSTEM AND METHOD WITH AUTOMATIC PRESSURE SWITCH POINT ADJUSTMENT

(71) Applicant: Emhart Glass S.A., Cham (CH)

(72) Inventors: Andreas Helfenstein, Lucerne (CH); Hartmut Geisel, Obernkirchen (DE); Christian Fröba, Oberägeri (DE)

(73) Assignee: Emhart Glass S.A., Cham (CH)

( * ) Notice: Subject to any disclaimer, the term of this patent is extended or adjusted under 35 U.S.C. 154(b) by 112 days.

(21) Appl. No.: 14/057,353

(22) Filed: Oct. 18, 2013

(65) Prior Publication Data

US 2014/0041415 A1 Feb. 13, 2014

Related U.S. Application Data

(62) Division of application No. 13/232,039, filed on Sep. 14, 2011, now Pat. No. 8,561,428.

(51) Int. Cl.
*C03B 9/193* (2006.01)
*C03B 9/41* (2006.01)

(52) U.S. Cl.
CPC ............ *C03B 9/1932* (2013.01); *C03B 9/1936* (2013.01); *C03B 9/41* (2013.01)

(58) Field of Classification Search
CPC ...... C03B 7/082; C03B 7/086; C03B 9/1936; C03B 9/1938
USPC ............................................. 65/29.12, 29.15
See application file for complete search history.

(56) References Cited

U.S. PATENT DOCUMENTS

| | | | |
|---|---|---|---|
| 4,613,352 A | 9/1986 | Krumme et al. |
| 4,662,923 A | 5/1987 | Vajda et al. |
| 4,867,778 A | 9/1989 | Pinkerton |
| 5,236,485 A | 8/1993 | Leweringhaus et al. |
| 5,266,093 A | 11/1993 | Konishi et al. |
| 5,644,227 A | 7/1997 | Geisel |
| 5,800,590 A | 9/1998 | Pilskar |
| 6,050,172 A | 4/2000 | Corves et al. |
| 6,079,226 A | 6/2000 | Leidy |
| 6,185,829 B1 | 2/2001 | Geisel |
| 7,290,406 B2 | 11/2007 | Anheyer |

FOREIGN PATENT DOCUMENTS

| | | |
|---|---|---|
| EP | 0691940 | 5/1997 |
| EP | 1002960 | 11/1999 |
| EP | 1127853 | 2/2001 |
| EP | 1466871 | 3/2004 |
| JP | 09142853 | 6/1997 |

*Primary Examiner* — Joseph S Del Sole
*Assistant Examiner* — Cynthia Szewczyk
(74) *Attorney, Agent, or Firm* — Reinhart Boerner Van Deuren S.C.

(57) ABSTRACT

A dwell time control system and method for automatically adjusting the selection and timing of a sequence of pressures used to drive the plunger in a parison mold during the parison forming process. The timing of characteristics of the observed press curve from one or more previous parison forming cycles are ascertained and used to control the timing of the changes in pressure during a subsequent parison forming cycle. The timings of these changes of pressure are determined as predetermined percentages of the timings of the characteristics in order to prevent the blow mold from being forced open and in order to prevent the occurrence of an overpressed finish.

20 Claims, 2 Drawing Sheets

DWELL TIME CONTROL SYSTEM AND METHOD WITH AUTOMATIC PRESSURE SWITCH POINT ADJUSTMENT

CROSS-REFERENCE TO RELATED APPLICATION

This patent application is a continuation of U.S. patent application Ser. No. 13/232,039, filed on Sep. 14, 2011, entitled "Dwell Time Control Method and System With Automatic Pressure Switch Point Adjustment," now U.S. Pat. No. 8,561,428, granted on Oct. 22, 2013, which is assigned to the assignee of the present patent application and which is hereby incorporated herein by reference in its entirety.

BACKGROUND OF THE INVENTION

Field of the Invention

The present invention relates generally to the pressure used to operate the plunger in a parison mold, and more particularly to a dwell time control system and method for automatically adjusting the selection and timing of a sequence of pressures used to drive the plunger during the parison forming process.

Glass containers are made in a manufacturing process that has three parts, namely the batch house, the hot end, and the cold end. The batch house is where the raw materials for glass (typically including sand, soda ash, limestone, cullet (crushed, recycled glass), and other raw materials) are prepared and mixed into batches. The hot end begins with a furnace, in which the batched materials are melted into molten glass, and from which a stream of molten glass flows.

The molten glass is cut into cylinders of glass called gobs, which fall by gravity into blank molds, sometimes referred to as parison molds. In the blank molds, a pre-container referred to as a parison is formed, typically by using a metal plunger to push the glass into the blank mold, or alternately by blowing the glass from below into the blank mold. The parison is inverted and transferred to a mold, where it is blown out into the shape of the container. An annealing process performed in an annealing oven or Lehr heats the containers and then slowly and evenly cools them over an extended time period to prevent them from having weakened glass caused by stresses caused by uneven cooling. The equipment at the cold end of the glass container manufacturing process inspects the containers to ensure that they are of acceptable quality.

The present invention is concerned with the parison formation process using a plunger to push the glass into the blank mold. Parisons are molded in a blank mold in an inverted position. The blank mold has two halves, and completing the finish portion are two neck ring molds located below the blank mold halves, with an upwardly oriented plunger extending through the neck ring halves and into the bottom of the blank mold halves. The blank mold halves are open at the tops thereof, and a gob of molten glass drops through this opening into the blank mold halves. A baffle is placed on top of the blank mold halves to close the opening at the top thereof, and the plunger is raised to force the gob to fill the entire cavity defined by the blank mold halves, the neck ring halves, and the baffle, thereby forming the parison. Upon completion of the cycle, the baffle is removed and the mold halves open, with the neck ring halves then transporting the parison to the blow molds.

Plunger contact time or dwell time is a particularly important parameter when producing in a narrow neck press and blow glass container manufacturing process or in a press and blow production in general. The full contact of the plunger with the glass in the gob that occurs during plunger contact or dwell time influences the characteristics of parisons produced for use in further steps in the glass container forming process. While dwell time depends on a number of parameters including friction in the movement of the plunger and glass temperature, it can also be strongly influenced by the pressure driving the plunger in its upward motion.

The plunger was formerly driven by a hydraulic system, as shown for example in U.S. Pat. No. 4,662,923, to Vajda et al. and U.S. Pat. No. 4,867,778, to Pinkerton et al., both of which are assigned to the assignee of the present patent application, and both of which are hereby incorporated herein by reference in their entirety. Both of these patents used feedback to monitor the position of the plunger and to use plunger position information to control the parison formation process to improve parison uniformity and quality.

In order to reduce the risk of fire associated with the use of hydraulic fluid in the operation of the plunger and other system components, pneumatic systems using compressed air were adopted, as illustrated in European Patent No. 0691940, to Plater et al., and in U.S. Pat. No. 5,800,590, to Pilskar, both of which are assigned to the assignee of the present patent application, and both of which are hereby incorporated herein by reference in their entirety. The '940 Patent used a proportional control valve operated by a microcontroller dependent upon position and pressure feedback signals from the plunger drive piston and cylinder. The '590 Patent used an initial higher pressure for a short time followed by a succeeding lower pressure that was approximately 70% of the initial higher pressure to operate the plunger.

The operation of the plunger was further refined by controlling the movement of the plunger, as illustrated in U.S. Pat. No. 6,050,172, to Schwegler et al., and in U.S. Pat. No. 7,290,406, to Anheyer, both of which are assigned to the assignee of the present patent application, and both of which are hereby incorporated herein by reference in their entirety. The '172 Patent controls the timing of valves providing compressed air to both sides of a piston driving the plunger, and the '406 Patent provides a feedback control system for driving the plunger at desired speeds.

After comparing the determined value with the desired dwell time, past closed loop controller increased or decreased the pressure for driving up the plunger until the resulting dwell time corresponds to the desired dwell time value has been achieved. However, simply increasing the pressure for plunger movement resulted in bottle defects, especially during dwell time. An alternative solution was moving the plunger up with different pressures (high, medium, low). However, this alternative presented problems in selecting when to switch from a higher to a lower pressure.

An illustration of such a problem is found in European Patent No. 1466871, to Krumme, which is hereby incorporated herein by reference in its entirety, describes a method of operating the plunger that somewhat varies the teachings of the '590 Patent to have second and third different lower pressures following an initial higher pressure to operate the plunger. The second pressure is controlled to bring the plunger to completely fill the cavity defined by the mold halves, the neck ring halves, and the baffle at a fixed time at which point a fixed pressing time at the third pressure begins, which third pressure may be less than (in the primary embodiment) or greater than (in an alternate embodiment) the second pressure. Thus, the duration of the applications of the first and third pressures is predetermined (meaning that the duration of the second pressure is also predetermined since the overall machine is operating at a predetermined speed), with the only variable being selecting the second pressure to be sufficient to completely fill the cavity by the end of application of the second pressure.

A key deficiency of the '871 Patent is that the detection of the point at which the plunger has completely filled the cavity is made by detecting that the plunger has reached a predefined position rather than actually detecting when the plunger has completely filled the cavity (see paragraph 0012 and Claim 2 of the '871 Patent). Measuring the position of the plunger may be performed, for example, using the device disclosed in U.S. Pat. No. 6,185,829, to Geisel, which is hereby incorporated herein by reference in its entirety. Further, since the first pressure is only maintained for a short period of time, the operation of the plunger with the second pressure must be sufficiently high to reach the predefined position in the required time period, but not so high that it will drive open the mold halves (see the last sentence in paragraph 0010 of the '871 Patent). This is a compromise that necessarily cannot result in optimizing system performance. Due to the difficulties associated with multi-pressure pressing, most glass container manufacturing plants still press with only a single pressure level that is sufficiently low to prevent the related defects, but also certainly less than an optimal solution.

It is accordingly desirable that the present invention provide an improved dwell time control method and system that results in the ability to control the dwell time (the time that the plunger is in full contact with the parison). It is also desirable that the improved dwell time control method and system automate the pressure switching process without requiring operator input once the process has been initiated. It is further desirable that the dwell time control method and system prevent the inadvertent opening of molds due to the occurrence of overpressure situations.

The dwell time control method and system of the present invention must also be of construction which is both durable and long lasting, and it should also require little or no maintenance to be provided by the user throughout its operating lifetime. In order to enhance the market appeal of the dwell time control method and system of the present invention, it should also be of inexpensive construction to thereby afford it the broadest possible market. Finally, it is also an objective that all of the aforesaid advantages of the dwell time control method and system of the present invention be achievable without incurring any substantial relative disadvantage.

The subject matter discussed in this background of the invention section should not be assumed to be prior art merely as a result of its mention in the background of the invention section.

Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, the operation of the plunger is controlled to optimize the dwell time of the plunger in contact with the parison. It results in the ability to fully automate the pressure switching process without requiring operator input once the process has been initiated. It also prevents the blank molds from being inadvertently forced open due to the occurrence of overpressure situations in the operation of the plunger.

The dwell time control method and system of the present invention uses three consecutive pressures to operate the plunger to form the parison from the glass gob in the blank mold. The total time for operating the plunger to form the parison is predefined and unchangeable time period since it is established by the operational cycle timing of the I.S. machine, so the timings that are variable are the time that the pressure is changed from the first pressure to the second pressure, and the time that the second pressure is changed to the third pressure. The dwell time control method and system of the present invention bases these times on the observed press curve from one or more previous parison forming cycles.

The timing of two characteristics of the observed press curve from one or more previous parison forming cycles are determined: the time at which the upper part of the mold becomes filled with glass from the glass gob that causes an increase in the resistance encountered by the parison is detected by the occurrence of a nonlinearity in the press curve; and the time at which the mold becomes completely filled with glass from the glass gob that results in a slowing in the movement of the plunger below a particular level. By ascertaining these times (each of which is measured from the initiation of the parison forming cycle), the times at which pressure changes can be determined.

The time that the pressure is changed from the first pressure to the second pressure is a first predetermined percentage of the ascertained time at which the upper part of the mold becomes filled with glass, and the time that the pressure is changed from the second pressure to the third pressure is a second predetermined percentage of the time at which the mold becomes completely filled with glass. The two characteristics from one previous parison forming cycle may be used, or more than one previous parison forming cycles may be used by averaging the ascertained times from the previous parison forming cycles. The first predetermined percentage is less than one hundred percent in order to prevent the blow mold from being forced open, and the second predetermined percentage is less than one hundred percent in order to prevent the occurrence of an overpressed finish.

In a system embodiment for operating a plunger for molding a parison in a blank mold, the plunger being driven by a piston in a cylinder to which a source of a pressurized medium may be applied at selected pressures, the system includes: a position sensor that monitors the position of the plunger in the blank mold versus time during at least one parison forming cycle beginning at a time $t_1$ and ending at a time $t_4$; and a control system adapted to detect a first characteristic of the movement of the plunger at a time $t_2$ during the at least one monitored parison forming cycle and a second characteristic of the movement of the plunger at a time $t_3$ in the at least one monitored parison forming cycle; wherein the control system is also adapted to determine a time $t_{p2}$ before $t_2$ based on time $t_2$ and to determine a time $t_{p3}$ before $t_3$ based on time $t_3$; and wherein the control system is further adapted to apply a first pressure from time $t_1$ to time $t_{p2}$, a second pressure from time $t_{p2}$ to time $t_{p3}$, and a third pressure from time $t_{p3}$ to time $t_4$ during a parison forming cycle subsequent to the at least one monitored parison forming cycle, after a gob is loaded into the blank mold.

In a system embodiment for operating a plunger for molding a parison in a blank mold, the plunger being driven by a piston in a cylinder to which a source of a pressurized medium may be applied at selected pressures, the system includes: a position sensor that monitors the position of the plunger in the blank mold versus time during a parison forming cycle beginning at a time $t_1$ and ending at a time $t_4$; and a control system adapted to detect a nonlinearity in the movement of the plunger during the monitored parison forming cycle that is indicative of an upper part of the blank mold having been filled with glass from the glass gob at a time $t_2$; wherein the control system is also adapted to detect a movement-related characteristic of the plunger during the monitored parison forming cycle that falls below a preselected level at a time $t_3$, the movement related characteristic falling below the preselected level being indicative of the glass from the glass gob having been distributed throughout the blank mold to fill the blank mold; and wherein the control system is further adapted to apply a first pressure from time $t_1$ to time $t_{p2}$, a second pressure from time $t_{p2}$ to time $t_{p3}$, and a third pressure from time $t_{p3}$ to time $t_4$ during a parison forming cycle subsequent to the monitored parison forming cycle, after a gob is loaded into the blank mold; wherein the time interval between time $t_1$ and time $t_{p2}$ is a first predetermined percentage of the time interval between time $t_1$ and time $t_2$; and wherein the time interval between time $t_1$ and time $t_{p3}$ is a second predetermined percentage of the time interval between time $t_1$ and time $t_3$.

In a system embodiment for operating a plunger for molding a parison in a blank mold, the plunger being driven by a piston in a cylinder to which a source of a pressurized medium may be applied at selected pressures, the system includes: a position sensor that monitors the position of the plunger in the blank mold versus time during parison forming cycles each beginning at a time $t_1$ and ending at a time $t_4$; and a control system adapted to detect a nonlinearity in the movement of the plunger during the monitored parison forming cycle that is indicative of an upper part of the blank mold having been filled with glass from the glass gob at a time $t_2$; wherein the control system is also adapted to detect a movement-related characteristic of the plunger during the monitored parison forming cycle that falls below a preselected level at a time $t_3$, the movement related characteristic falling below the preselected level being indicative of the glass from the glass gob having been distributed throughout the blank mold to fill the blank mold; and wherein the control system is further adapted to apply a first pressure from time $t_1$ to time $t_{p2}$, a second pressure from time $t_{p2}$ to time $t_{p3}$, and a third pressure from time $t_{p3}$ to time $t_4$ during a parison forming cycle subsequent to the monitored parison forming cycle, after a gob is loaded into the blank mold; wherein the time interval between time $t_1$ and time $t_{p2}$ is a first predetermined percentage of the time interval between time $t_1$ and time $t_2$; and wherein the time interval between time $t_1$ and time $t_{p3}$ is a second predetermined percentage of the time interval between time $t_1$ and time $t_3$.

It may therefore be seen that the present invention teaches an improved dwell time control method and system that results in the ability to control the dwell time (the time that the plunger is in full contact with the parison). The improved dwell time control method and system automates the pressure switching process without requiring operator input once the process has been initiated. The dwell time control method and system also prevents the inadvertent opening of molds due to the occurrence of overpressure situations.

The dwell time control method and system of the present invention is of a construction which is both durable and long lasting, and which will require little or no maintenance to be provided by the user throughout its operating lifetime. The dwell time control method and system of the present invention is also of inexpensive construction to enhance its market appeal and to thereby afford it the broadest possible market. Finally, all of the aforesaid advantages and objectives of the dwell time control method and system of the present invention are achieved without incurring any substantial relative disadvantage.

DESCRIPTION OF THE DRAWINGS

These and other advantages of the present invention are best understood with reference to the drawings, in which.

DETAILED DESCRIPTION OF AN EXEMPLARY EMBODIMENT

Figure 1:
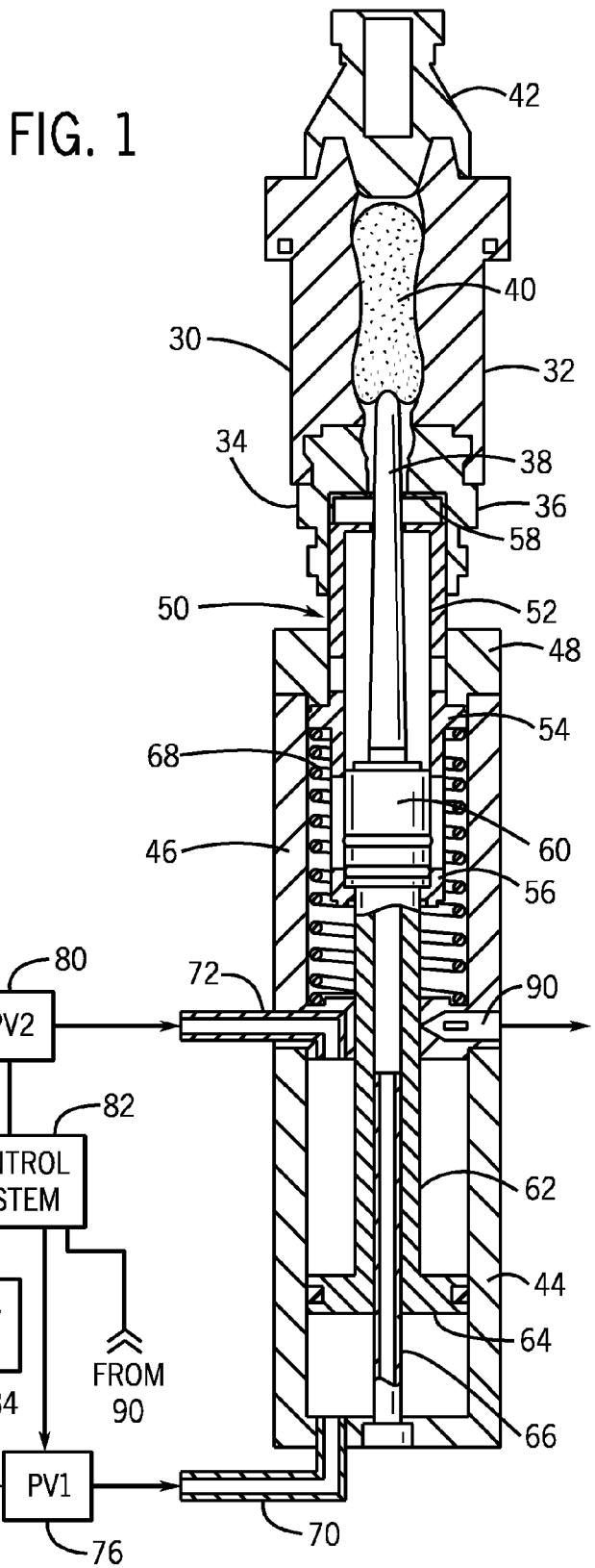
FIG. 1 is a schematic cross-sectional view of a blank mold and an associated plunger mechanism illustrating a glass gob in the blank mold with the plunger in the loading position in the blank mold.

Referring first to FIG. 1, a blank mold and an associated plunger mechanism are illustrated. The mold includes two mold halves 30 and 32, which are shown as being closed atop two neck ring halves 34 and 36. A plunger 38 is shown extending upwardly into the bottom of the mold halves 30 and 32, with the plunger 28 being in the loading position in the mold halves 30 and 32. A glass gob 40 is shown loaded into the mold halves 30 and 32, with a baffle 42 shown atop the mold halves 30 and 32 and closing the top ends thereof.

The plunger operating mechanism is housed by a lower cylinder 44, and upper cylinder 46 on top of the lower cylinder 44, and a cylinder cap 48 that is mounted on top of the upper cylinder 46. A hollow sleeve 50 has a cylindrical upper portion 52 that extends upwardly through the cylinder cap 48 and into the area between the bottom portions of the neck ring halves 34 and 36. The sleeve 50 has a central portion that includes an outwardly extending circular flange 54, and a bottom portion 56. A guiding ring 58 is located at the top of the upper portion 52 of the sleeve 50, and the plunger 38 extends through the upper portion 52 of the sleeve 50 and the guiding ring 58 and into the bottom of the mold halves 30 and 32.

The bottom of the plunger 38 is mounted onto the top of a plunger base 60, which is slidably mounted in the interior of the sleeve 50. The bottom of the upper cylinder 46 has a reduced diameter aperture located therein in which a piston rod 62 is slidably mounted. The piston rod 62 is connected at its top end thereof to the bottom of the plunger base 60, and at its bottom end to the top of a piston 64 that is slidably mounted in the bottom cylinder 44. It will be appreciated that movement of the piston 64 in the lower cylinder 44 will drive the plunger 38.

A cooling tube 66 extends from the closed bottom of the lower cylinder 44 upwardly through the piston 64 and into the hollow interior of the piston rod 64 to provide cooling fluid thereinto. A spring 68 is mounted in the upper cylinder 46, and extends between the top side of the bottom of the upper cylinder 46 and the bottom side of the circular flange 54. The spring 68 functions to bias the plunger 38 to its loading position as shown in FIG. 1 by driving the circular flange 54 of the sleeve 50 into contact with the underside of the cylinder cap 48 in the absence of any downward pressure on the piston 64 in the lower cylinder 44.

Pressurized fluid (typically compressed air) may be supplied to drive the piston 64 and the plunger upwardly through a first or lower inlet 70, and pressurized fluid may be supplied to drive the piston 64 and the plunger 38 downwardly through a second or upper inlet 72. It should be noted that in order to drive the plunger 38 downwardly from the loading position it is illustrated in FIG. 1 it is necessary to overcome the force of the spring 68. This will also cause the sleeve 50 and the guiding ring 58 to be lowered from their respective positions illustrated in FIG. 1 to somewhat retract them from the neck ring halves 34 and 36.

Pressurized fluid is supplied from a first pressure source 74 with both the flow of pressurized fluid from the first pressure source 74 and the pressure at which the pressurized fluid is supplied to the lower inlet 70 being controlled by a first proportional valve 76. Similarly, pressurized fluid is supplied from a second pressure source 78 with both the flow of pressurized fluid from the second pressure source 78 and the pressure at which the pressurized fluid is supplied to the upper inlet 72 being controlled by a second proportional valve 80 (although a simple on/off valve will also suffice since the function is simply to drive the piston 64 to retract the plunger downwardly).

The operation of the first proportional valve 76 and the second proportional valve 80 are controlled by a control system 82, which stores programmed information and data in a memory 84. The operation of the control system 82 may be monitored on a display 86, and controlled using an input control 88. Information regarding the position of the plunger 38 is provided by a position sensor 90 that monitors the position of the piston rod 62, the movement of which corresponds with the position of the distal end of the plunger 38 in the mold halves 30 and 32. The position sensor 90 uses the relative positions of the piston 64 and the piston rod 62 with respect to the cooling tube 66 to provide an input regarding the position of the plunger 38 to the control system 82.

Figure 2:
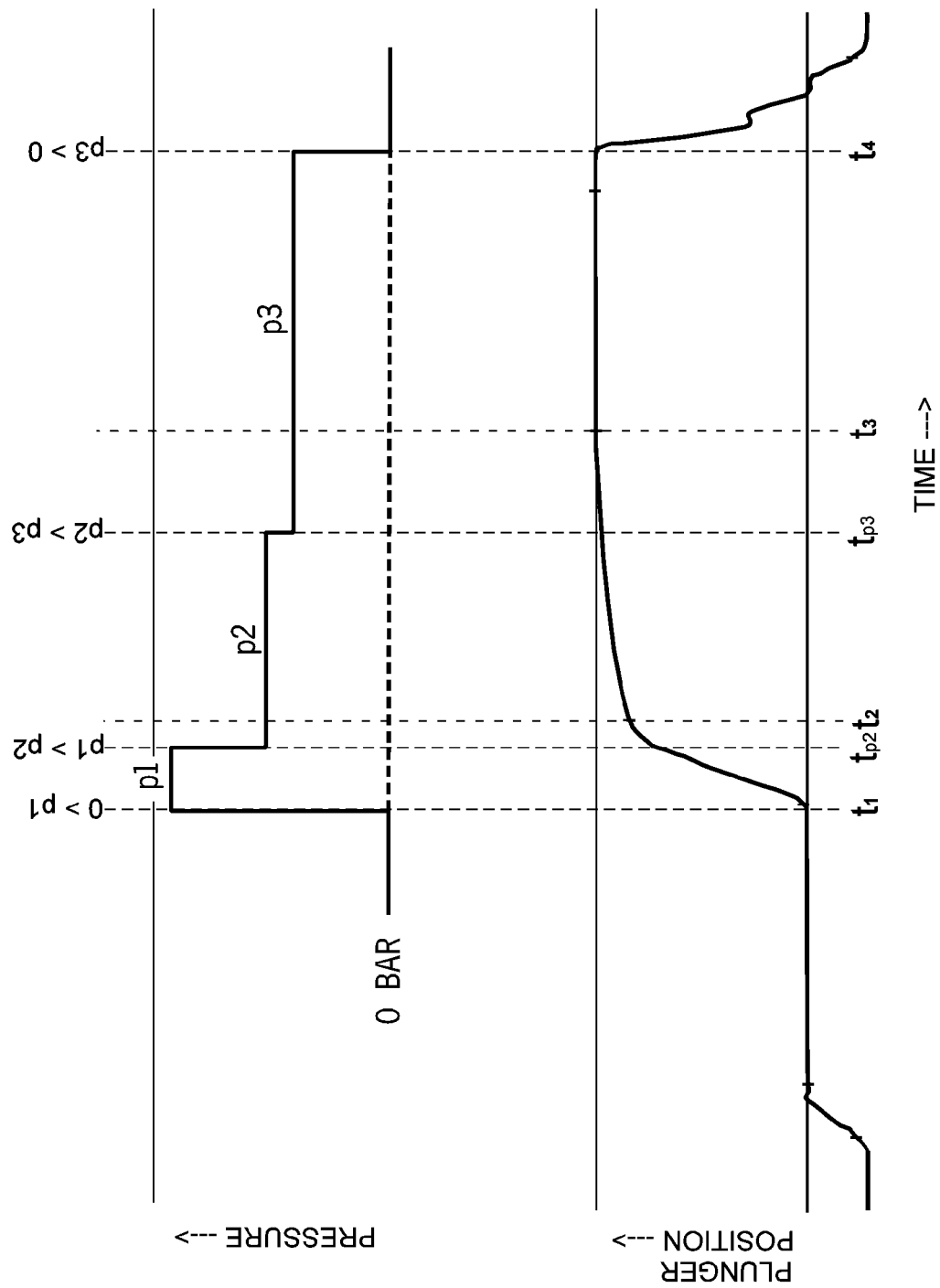
FIG. 2 depicts two time-aligned plots associated with the dwell time control method and system of the present invention, with the top plot showing the pressure supplied to the plunger mechanism illustrated in FIG. 1 to press it into the glass gob to form a parison, and the bottom plot showing the actual position of the plunger in the blank mold.

Referring next to FIG. 2, an exemplary use of a three-pressure operation to drive the plunger 38 (shown in FIG. 1) from the loading position (in which it is illustrated in FIG. 1) to form the parison from the glass gob in the blank mold is illustrated. According to the teachings of the present invention, the three consecutive pressures, referred to herein as p1, p2, and p3, are cumulatively applied during a time period beginning at time $t_1$ and ending at time $t_4$. It will be appreciated by those skilled in the art that a single cycle of the blow molding process lasts for a predefined and unchangeable time period that is determined by the operational speed of the I.S. machine (typically one full cycle lasts for approximately four to five seconds). Similarly, the time period beginning at time $t_1$ and ending at time $t_4$ is a predefined and similarly unchangeable time period that is established by the timing of the cycle of the operations of the I.S. machine (typically this time period is approximately one second).

The dwell time control method and system of the present invention detects two events that occur during the time period that begins at time $t_1$ and ends at time $t_4$, with the respective times at which these two events occur being time $t_2$ and time $t_3$. The first of these events, which occurs at time $t_2$, is when the plunger 38 (shown in FIG. 1) has forced the glass gob 40 (also shown in FIG. 1) to hit the baffle 42 (also shown in FIG. 1), at which point a non-linear increase in resistance to further movement of the plunger 38 due to the upper part of the mold having been filled with glass from the glass gob 40.

This may be seen in FIG. 2 in the bottom plot which shows the position of the plunger 38 in the blank mold at the point identified by the intersection of the plot with the time $t_2$. At the point where the upper part of the mold is completely filled with glass from the glass gob 40, there is a readily observable nonlinear characteristic or "knee" in the plot of the position of the plunger 38 in the blank mold. This time $t_2$ may be detected by the dwell time control method and system of the present invention by monitoring the first and second derivatives (velocity and acceleration) of the position of the plunger 38 in the blank mold.

The second of these events, which occurs at time $t_3$, is when the first and second derivatives (velocity and acceleration) of the plunger 38 have fallen below preset levels, which generally occurs when the glass from the glass gob 40 has been distributed throughout the entire blank mold, completely filling it. This may be seen in FIG. 2 in the bottom plot showing the position of the plunger 38 in the blank mold at the point identified by the intersection of the plot with the time $t_3$. The time period from time $t_1$ to time $t_3$ is parison forming time and is also referred to as the "pressing time." During the time period beginning at time $t_3$ and ending at time $t_4$, the final pressing of the glass in the mold into a parison occurs. This time period, which is commonly referred to as the "dwell time," is generally at least a certain time period, for example approximately between 400 and 600 milliseconds.

Thus, what can be varied by the dwell time control method and system of the present invention are the time at which the first pressure p1 is changed to the second pressure p2, which time will be referred to herein as time $t_{p2}$, and the time at which the second pressure p2 is changed to the third pressure p3, which time will be referred to herein as time $t_{p3}$. The present invention uses the measured times $t_2$ and $t_3$ of two detected events from the plot of the position of the plunger 38 in the blank mold during previous cycles as the triggering events to calculate the time $t_{p2}$ at which the pressure applied to the plunger 38 will change from p1 to p2, and the time $t_{p3}$ at which the pressure applied to the plunger 38 will change from p2 to p3.

The first pressure p1 is highest since higher pressure is needed to overcome initial friction and to accelerate the movement of the plunger 38. However, this higher first pressure p1 must be removed before the glass in the glass gob 40 hits the baffle 42 in order to prevent the blow mold from being forced open. In order to ensure that this does not happen, the time interval between time $t_1$ and time $t_{p2}$ after which the pressure applied to the plunger 38 will change from p1 to p2 is selected to be a percentage of the measured time interval between time $t_1$ and time $t_2$ for one or more previous I.S. machine cycles (if this time interval is measured for more than one machine cycle, the measured times may be averaged).

In a preferred embodiment, the time interval between time $t_1$ and time $t_{p2}$ can vary from approximately sixty percent to approximately ninety-five percent of the time interval between time $t_1$ and time $t_2$. In a more preferred embodiment, the time interval between time $t_1$ and time $t_{p2}$ can vary from approximately seventy percent to approximately ninety percent of the time interval between time $t_1$ and time $t_2$. In a most preferred embodiment, the time interval between time $t_1$ and time $t_{p2}$ is approximately eighty percent of the time interval between time $t_1$ and time $t_2$.

The number of prior cycles over which the time interval between time $t_1$ and time $t_2$ can be measured and averaged may be varied from one cycle (in which case no averaging is needed) to one hundred cycles or even more in preferred embodiments, with consideration being given to a balancing of only recent cycles being used and a greater number of cycles being used. In a more preferred embodiment, this balancing uses a number of cycles that is between approximately three cycles and approximately twenty cycles to calculate the average, and in a most preferred embodiment, this balancing uses approximately eight cycles to calculate the average. In each case, the measurements of the time interval between time $t_1$ and time $t_2$ are used for the given number of immediately preceding cycles, so that a new average value is calculated for each succeeding cycle.

The third pressure p3 may be lower than the second pressure p2 in order to have a higher pressure p2 to complete the pressing time of the glass gob 40 in the blank mold quickly and to have a lower pressure p3 in order to prevent the occurrence of an overpressed finish. In this case, this higher second pressure p2 should be removed before the glass in the glass gob 40 fills the blank mold in order to prevent the finish from being overpressed. In order to ensure that this does not happen, the time interval between time $t_1$ and time $t_{p3}$ after which the pressure applied to the plunger 38 will change from p2 to a lower p3 is selected to be a percentage of the measured time interval between time $t_1$ and time $t_3$ (alternately, it could instead be a percentage of the measured time interval between time $t_{p2}$ and time $t_3$, or even a percentage of the measured time interval between time $t_2$ and time $t_3$, although these alternatives are not the most preferred implementation of the dwell time control method and system of the present invention).

In a preferred embodiment, the time interval between time $t_1$ and time $t_{p3}$ can vary from approximately fifty percent to approximately ninety percent of the time interval between time $t_1$ and time $t_3$. In a more preferred embodiment, the time interval between time $t_1$ and time $t_{p3}$ can vary from approximately sixty percent to approximately eighty percent of the time interval between time $t_1$ and time $t_3$. In a most preferred embodiment, the time interval between time $t_1$ and time $t_{p3}$ is approximately seventy percent of the time interval between $t_1$ and $t_3$.

The number of prior cycles over which the time interval between time $t_1$ and time $t_3$ can be measured and averaged may be varied from one cycle (in which case no averaging is needed) to one hundred cycles or even more in preferred embodiments, with consideration being given to a balancing of only recent cycles being used and a greater number of cycles being used. In a more preferred embodiment, this balancing uses a number of cycles that is between approximately three cycles and approximately twenty cycles to calculate the average, and in a most preferred embodiment, this balancing uses approximately eight cycles to calculate the average. In each case, the measurements of the time interval between time $t_1$ and time $t_3$ are used for the given number of immediately preceding cycles, so that a new average value is calculated for each succeeding cycle.

If the first alternate embodiment mentioned above is used instead, the time interval between time $t_{p2}$ and time $t_{p3}$ can vary from approximately forty-five percent to approximately eighty-five percent of the time interval between time $t_{p2}$ and time $t_3$. In a more preferred embodiment, the time interval between time $t_{p2}$ and time $t_{p3}$ can vary from approximately fifty-five percent to approximately seventy-five percent of the time interval between time $t_{p2}$ and time $t_3$. In a most preferred embodiment, the time interval between time $t_{p2}$ and time $t_{p3}$ is approximately sixty-five percent of the time interval between time $t_{p2}$ and time $t_3$.

In some instances (such as, for example, producing wide mouth glass containers) it may be desirable to have p3 be greater than p2 (and also to have p2 be greater than p1). This may be done because during the dwell time the plunger 38 is in contact with the parison in the glass gob 40 in the blank mold, and as such is either not moving or moving at such an exceedingly low rate that it has essentially no momentum. As such, it may be possible for the dwell time pressure to be higher than the second pressure p2 used during the pressing time, although this alternatives is generally not the most preferred implementation of the dwell time control method and system of the present invention (except perhaps in the production of wide mouth glass containers).

Since the time period that begins at time $t_1$ and ends at time $t_4$ is fixed, and since it is desirable to have a dwell time beginning at time $t_3$ and ending at time $t_4$ that is at least a minimum time period long, such as, for example, between approximately 400 and 600 milliseconds long, it is possible in an alternate embodiment to have the objective of defining a desired value for the time $t_3$. By varying the values of either the second pressure p2 only, or by varying the values of both the first pressure p1 and the second pressure p2 with them in a fixed relationship (e.g., the first pressure p1 is equal to 1.12 times the second pressure p2), this objective for a dwell time beginning at a desired value for the time $t_3$ can be realized in relatively few parison forming cycles.

Depending upon the specific mold design, various loading possibilities, and the variations possible in other parameters, virtually every possible combination of p1, p2, p3 levels could, in some instances, make sense. All possible combinations are thus viewed as being encompassed by the improved dwell time control method and system.

It may therefore be appreciated from the above detailed description of the preferred embodiment of the present invention that it teaches an improved dwell time control method and system that results in the ability to control the dwell time (the time that the plunger is in full contact with the parison in the gob). The improved dwell time control method and system automates the pressure switching process without requiring operator input once the process has been initiated. The dwell time control method and system also prevents the inadvertent opening of molds due to the occurrence of overpressure situations.

The dwell time control method and system of the present invention is of a construction which is both durable and long lasting, and which will require little or no maintenance to be provided by the user throughout its operating lifetime. The dwell time control method and system of the present invention is also of inexpensive construction to enhance its market appeal and to thereby afford it the broadest possible market. Finally, all of the aforesaid advantages and objectives of the dwell time control method and system of the present invention are achieved without incurring any substantial relative disadvantage.

Although the foregoing description of the dwell time control method and system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A system for operating a plunger for molding a parison in a blank mold, the plunger being driven by a piston in a cylinder to which a source of a pressurized medium may be applied at selected pressures, the system comprising:
   a position sensor that monitors the position of the plunger in the blank mold versus time during at least one parison forming cycle beginning at a time $t_1$ and ending at a time $t_4$; and
   a control system programmed to detect a first characteristic of the movement of the plunger at a time $t_2$ during the at least one monitored parison forming cycle and a second characteristic of the movement of the plunger at a time $t_3$ in the at least one monitored parison forming cycle;
   wherein the control system is also programmed to determine a time $t_{p2}$ before $t_2$ based on time $t_2$ and to determine a time $t_{p3}$ before $t_3$ based on time $t_3$; and
   wherein the control system is further programmed to apply a first pressure from time $t_1$ to time $t_{p2}$, a second pressure from time $t_{p2}$ to time $t_{p3}$, and a third pressure from time $t_{p3}$ to time $t_4$ during a parison forming cycle subsequent to the at least one monitored parison forming cycle, after a gob is loaded into the blank mold.

2. A system as defined in claim 1, wherein the control system is configured such that the first characteristic of the movement of the plunger that the control system is configured to detect comprises:
   a nonlinearity detected by the control system in the movement of the plunger with respect to time which is indicative of an upper part of the mold having been filled with glass from the glass gob.

3. A system as defined in claim 1, wherein the control system is configured such that the first characteristic of the movement of the plunger that the control system is configured to detect at the time $t_2$ is the upper part of the mold having been filled with glass from the glass gob.

4. A system as defined in claim 1, wherein the control system is configured such that the second characteristic of the movement of the plunger that the control system is configured to detect comprises:
   a movement-related characteristic of the plunger detected by the control system that falls below a preselected level which is indicative of the glass from the glass gob having been distributed throughout the entire blank mold to completely fill it.

5. A system as defined in claim 1, wherein the control system is configured such that the second characteristic of the movement of the plunger that the control system is configured to detect at time $t_3$ is the glass from the glass gob having been distributed throughout the entire blank mold to completely fill it.

6. A system as defined in claim 1, wherein the control system is configured to apply the first pressure being larger than either the second pressure or the third pressure.

7. A system as defined in claim 6, wherein the control system is configured to apply the second pressure being greater than the third pressure.

8. A system as defined in claim 6, wherein the control system is configured to apply the third pressure being greater than the second pressure.

9. A system as defined in claim 1, wherein the position sensor is configured to monitor the position of the plunger in the blank mold versus time during each parison forming cycle beginning at a time $t_1$ and ending at a time $t_4$.

10. A system as defined in claim 9, wherein the control system is programmed to further detect the point in time during more than one monitored parison forming cycle at which the movement of the plunger in the blank mold with respect to time exhibits a non-linearity that is indicative of an increase in resistance to further movement of the plunger, that point in time being the time $t_2$; and
    wherein the control system is programmed to further detect the point in time during more than one monitored parison forming cycle at which the movement of the plunger in the blank mold with respect to time falls below a minimum threshold indicative of the end of a pressing cycle, that point in time being the time $t_3$.

11. A system as defined in claim 10, wherein the control system is configured to average the times $t_2$ during the more than one monitored parison forming cycle to determine the time $t_2$ for the parison forming cycle subsequent to the more than one monitored parison forming cycles.

12. A system as defined in claim 11, wherein the control system is configured to average the times $t_2$ during eight monitored parison forming cycles to determine the time $t_2$ for the parison forming cycle subsequent to the eight monitored parison forming cycles.

13. A system as defined in claim 10, wherein the control system is configured to average the times $t_3$ during the more than one monitored parison forming cycle to determine the time $t_3$ for the parison forming cycle subsequent to the more than one monitored parison forming cycles.

14. A system as defined in claim 13, wherein the control system is configured to average the times $t_3$ during eight monitored parison forming cycles to determine the time $t_3$ for the parison forming cycle subsequent to the eight monitored parison forming cycles.

15. A system as defined in claim 1, wherein the control system is configured to calculate the time interval between time $t_1$ and time $t_{p2}$ to be a first predetermined percentage of the time interval between time $t_1$ and time $t_2$ for the at least one monitored parison forming cycle; and
    wherein the control system is configured to calculate the time interval between time $t_1$ and time $t_{p3}$ to be a second predetermined percentage of the time interval between time $t_1$ and time $t_3$ for the at least one monitored parison forming cycle.

16. A system as defined in claim 15, wherein the control system is configured to calculate the time interval between time $t_1$ and time $t_{p2}$ to be eighty percent of the time interval between time $t_1$ and time $t_2$ for the at least one monitored parison forming cycle.

17. A system as defined in claim 15, wherein the control system is configured to calculate the time interval between time $t_1$ and time $t_{p3}$ to be seventy percent of the time interval between time $t_1$ and time $t_3$ for the at least one monitored parison forming cycle.

18. A system as defined in claim 1, wherein the control system is programmed to adjust either the second pressure or both the first pressure and the second pressure to achieve a desired dwell time interval between the time $t_3$ and the time $t_4$.

19. A system for operating a plunger in a blank mold to mold a parison from a glass gob, the plunger being driven by a piston in a cylinder to which a source of a pressurized medium may be applied at selected pressures, the system comprising:
  a position sensor configured to monitor the position of the plunger in the blank mold versus time during a parison forming cycle beginning at a time $t_1$ and ending at a time $t_4$; and
  a control system programmed to detect a nonlinearity in the movement of the plunger during the monitored parison forming cycle that is indicative of an upper part of the blank mold having been filled with glass from the glass gob at a time $t_2$;
  wherein the control system is programmed to detect a movement-related characteristic of the plunger during the monitored parison forming cycle that falls below a preselected level at a time $t_3$, the movement related characteristic falling below the preselected level being indicative of the glass from the glass gob having been distributed throughout the blank mold to fill the blank mold; and
  wherein the control system is programmed to apply a first pressure from time $t_1$ to time $t_{p2}$, a second pressure from time $t_{p2}$ to time $t_{p3}$, and a third pressure from time $t_{p3}$ to time $t_4$ during a parison forming cycle subsequent to the monitored parison forming cycle, after a gob is loaded into the blank mold;
  wherein the control system is programmed to determine the time interval between time $t_1$ and time $t_{p2}$ to be a first predetermined percentage of the time interval between time $t_1$ and time $t_2$; and
  wherein the control system is programmed to determine the time interval between time $t_1$ and time $t_{p3}$ to be a second predetermined percentage of the time interval between time $t_1$ and time $t_3$.

20. A system for operating a plunger in a blank mold to mold a parison from a glass gob, the plunger being driven by a piston in a cylinder to which a source of a pressurized medium may be applied at selected pressures, the system comprising:
  a position sensor configured to monitor the position of the plunger in the blank mold versus time during parison forming cycles each beginning at a time $t_1$ and ending at a time $t_4$; and
  a control system programmed to determine a time $t_2$ in each monitored parison forming cycle at which an upper part of the mold has been filled with glass from the glass gob;
  wherein the control system is programmed to determine a time $t_3$ in each monitored parison forming cycle at which the glass from the glass gob has been distributed throughout the entire blank mold to completely fill it; and
  wherein the control system is programmed to apply a first pressure from time $t_1$ to time $t_{p2}$, a second pressure from time $t_{p2}$ to time $t_{p3}$, and a third pressure from time $t_{p3}$ to time $t_4$ during each parison forming cycle, after a gob is loaded into the blank mold;
  wherein the control system is programmed to determine the time interval between time $t_1$ and time $t_{p2}$ to be a first predetermined percentage of a time interval based upon the time interval between time $t_1$ and time $t_2$ for one or more previous parison forming cycles; and
  wherein the control system is programmed to determine the time interval between time $t_1$ and time $t_{p3}$ to be a second predetermined percentage of a time interval based upon the time interval between time $t_1$ and time $t_3$ for one or more previous parison forming cycles.

* * * * *